United States Patent
Pitel

[19]

[11] Patent Number: 6,154,539
[45] Date of Patent: Nov. 28, 2000

[54] HEADSET ADAPTER FOR MICROPHONE AND EARPIECE

[75] Inventor: Matthew Pitel, Rogers, Minn.

[73] Assignee: Unicon, Incorporated, Minneapolis, Minn.

[21] Appl. No.: 09/163,959

[22] Filed: Sep. 30, 1998

[51] Int. Cl.$^7$ .................................................. H04M 1/00
[52] U.S. Cl. ............................................................... 379/430
[58] Field of Search ........................... 379/430; 381/376, 381/378, 379, 381

[56] References Cited

U.S. PATENT DOCUMENTS

| | | |
|---|---|---|
| D. 311,521 | 10/1990 | Jonsson et al. . |
| 1,587,643 | 6/1926 | Harman . |
| 2,474,135 | 6/1949 | White . |
| 2,513,746 | 7/1950 | Rohr . |
| 2,858,544 | 11/1958 | Roth . |
| 3,862,378 | 1/1975 | Norris . |
| 3,993,879 | 11/1976 | Larkin . |
| 4,020,297 | 4/1977 | Brodie . |
| 4,273,969 | 6/1981 | Foley et al. . |
| 4,335,281 | 6/1982 | Scott et al. . |
| 4,420,657 | 12/1983 | Larkin ...................................... 179/156 |
| 4,453,050 | 6/1984 | Enokido .................................... 179/182 |
| 4,634,816 | 1/1987 | O'Malley et al. ........................ 379/430 |
| 4,702,345 | 10/1987 | Janssen et al. . |
| 5,035,005 | 7/1991 | Hung .............................................. 2/209 |
| 5,210,792 | 5/1993 | Kajihara ................................... 379/430 |
| 5,757,944 | 5/1998 | Jensen et al. ............................. 381/187 |
| 5,787,166 | 7/1998 | Ullman ..................................... 379/430 |
| 5,960,094 | 9/1999 | Jensen et al. ............................. 381/381 |
| 6,038,329 | 3/2000 | Lee .......................................... 381/370 |

FOREIGN PATENT DOCUMENTS

| | | |
|---|---|---|
| 436377 | 10/1926 | Austria . |
| 158391 | 10/1985 | European Pat. Off. . |
| 60-10999 | 1/1985 | Japan . |
| 788099 | 3/1954 | United Kingdom . |
| 1377237 | 12/1974 | United Kingdom . |
| 2036505 | 6/1980 | United Kingdom . |

Primary Examiner—Jack Chiang
Assistant Examiner—Michael B. Cusick

[57] ABSTRACT

A microphone and earphone headset assembly, including an earphone housing having a microphone and boom pivotally attached, the earphone housing having a peripheral groove. An earpiece adapter includes a C-shaped clamp for fitting into the peripheral groove, and the adapter also has a mounting hole for attachment to a headset band or to an earpiece.

13 Claims, 3 Drawing Sheets

HEADSET ADAPTER FOR MICROPHONE AND EARPIECE

BACKGROUND OF THE INVENTION

The present invention relates to a headset apparatus for connection to a telephone circuit or the like. More particularly, the invention relates to a headset adapter for connecting an earphone/microphone either to a headset or to an earpiece, for facilitating the hands-free operation of a telephone.

There are at least two attachments to an earphone/microphone combination for enabling the hands-free operation of a telephone: one attachment comprises a resilient headset band which can be connected at one of its ends to an earphone which has a microphone boom attached thereto, wherein the band can be clamped against the user's head, to hold the earphone against the user's ear and the microphone proximate the user's mouth; the second attachment comprises an earpiece mechanically shaped for coupling to or against the user's ear, the earpiece having an attached earphone connected to a boom for attachment to a microphone. The present invention comprises an adapter for connecting an earphone/microphone combination to either the headset band attachment or the earpiece attachment.

It is a principal object of the invention to provide a multi-use adapter for holding a telephone earphone/microphone in operable relationship to a user.

It is another object of the invention to provide an adapter which is economical to construct and easy to replace, if necessary, during use.

Other objects, as well as advantages of the invention, will become apparent from the following specification and claims, and with reference to the appended drawings.

SUMMARY OF THE INVENTION

A telephone earphone/microphone combination, and an adapter connectable thereto, for attachment to a headset band which may be clamped about the user's head or to an earpiece holder which may be fitted over the user's ear. The adapter has a C-clamp construction which fits into a circumferential groove about the periphery of the earphone housing, with a key and keyway construction between the adapter and the earphone housing to align the adapter to the housing in the proper operational position. The adapter has a connection mechanism for attachment to either an earpiece or a headset band.

DESCRIPTION OF THE PREFERRED EMBODIMENT

Figure 1:
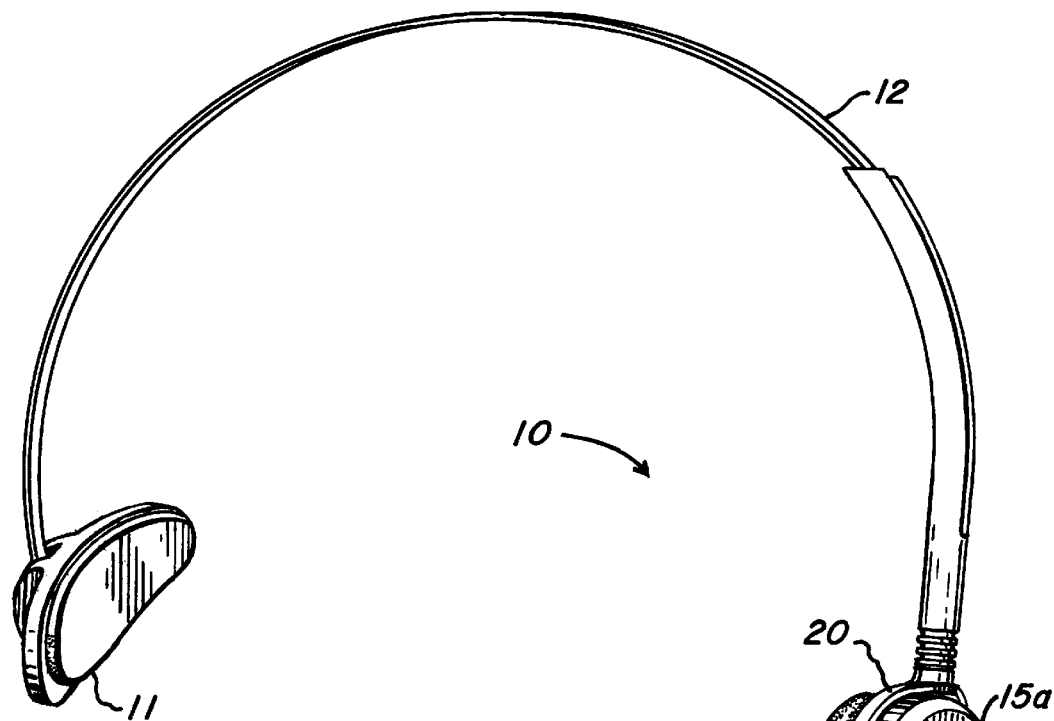
FIG. 1 shows an isometric view of a telephone headset with microphone and earphone attached.

Referring first to FIG. 1, there is shown a telephone headset 10, comprising a resilient band 12, an earphone housing 15, a microphone boom 16 and micro phone 18, a headrest 11, and an attachment adapter 20. The resilient band 12 may be constructed of plastic or spring steel, and the headrest 11 preferably has a cushioned inner surface to rest against the user's head. The earphone housing 15 has a cushioned inner surface area and is constructed to hold a small audio-frequency transducer (not shown) inside and directed inwardly toward the user's ear. The earphone housing 15 is also constructed with a rotatable turntable section 15a attached to the microphone boom 16; a wire extends from the microphone 18, through the boom 16, and into the housing 15. The microphone wire, and a similar wire connected to the earphone transducer, are brought out of housing 15 by connection to the headset lead 17. Headset lead 17 has a suitable plug or connector at its distal end for connection to the electronic circuits which drive the headset earphone and microphone. The earphone housing 15 is detachably connected to the band 12 by an adapter 20 which will be described in greater detail hereinafter.

Figure 2:
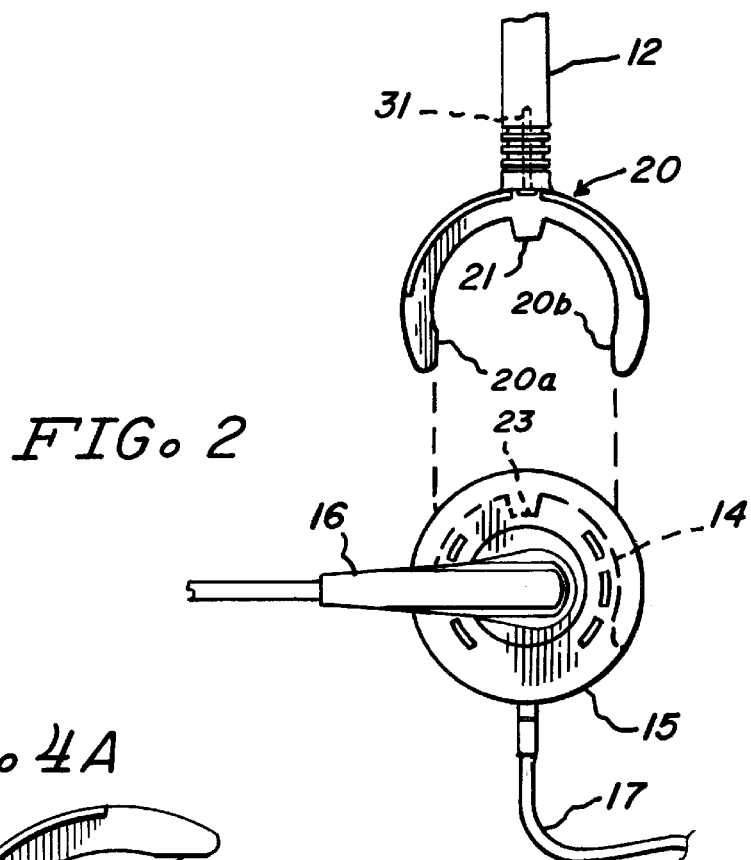
FIG. 2 shows an exploded partial view of the headset of FIG. 1 and the microphone/earphone of FIG. 1, in detached position.

FIG. 2 shows an exploded partial view of the apparatus of FIG. 1 with the adapter 20 removed from clamping against the earpiece housing 15. Adapter 20 has two C-shaped arms 20a and 20b which are somewhat resilient; the opening between the two arms 20a and 20b is narrower than the diameter of the housing 15 measured across the housing 15 between respective bottoms of arcuate slot 14. The arcuate slot 14 extends partially about the circumference of housing 15, to a depth sufficient to accept the C-shaped arms 20a and 20b. A key slot 23 extends more deeply into housing 15, from the bottom of slot 14. A projecting key 21 on adapter 20 extends inwardly toward the arc created by the C-shaped arms and is sized to fit into the key slot 23, so that the adapter 20 becomes locked into contact with housing 14 when the two are clamped together. Slot 14 and arms 20a and 20b are curved inwardly in a manner that permits the arms 20a and 20b to engage and interlock with the slot 23 only in a single mounting direction. The location of key slot 23 is diametrically opposite the exit point of wire leads 17. Adapter 20 is connected to the end of the resilient band assembly 12 by a screw 31 which is threaded through a hole in adapter 20 to engage threads in the end of resilient band assembly 12.

Figure 3:
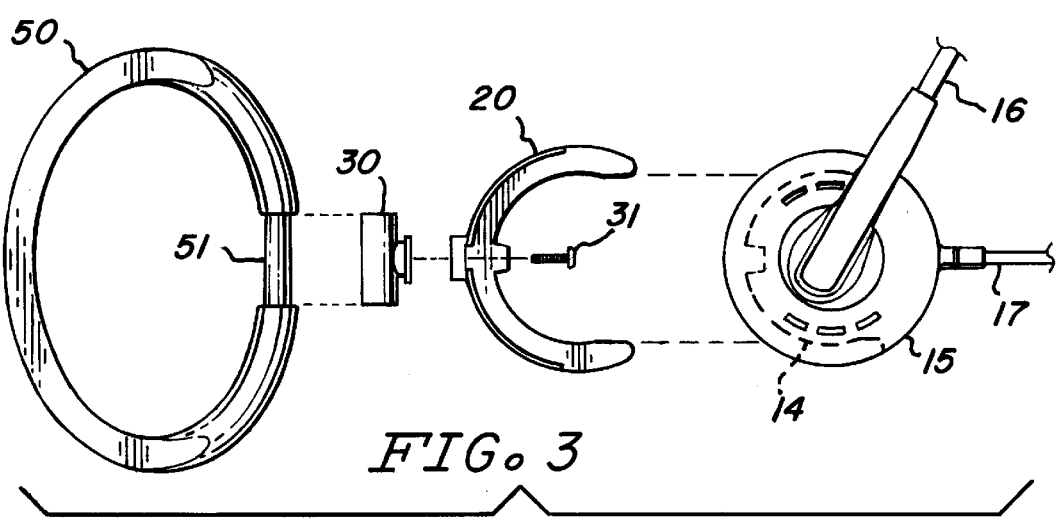
FIG. 3 shows an exploded partial view of a microphone/earphone combination, an attachment adapter, and an earpiece.

FIG. 3 shows an enlarged partial view of an alternative form of the invention. An earphone/microphone assembly is partially shown. Earphone housing 15 is shown in alignment with an adapter 20, and adapter 20 is shown in alignment with an earpiece hinge 30, and earpiece hinge 30 is aligned with an earpiece 50. The engagement of adapter 20 into the slot 14 of housing 15 has been described above; adapter 20 is connected to hinge 30 by a screw 31 which is threaded through adapter 20 and engaged into threads in hinge 30. Hinge 30 is a cylindrical member having an elongate opening through its side wall, and the two side walls formed thereby have a certain degree of resiliency, to enable them to clamp about the reduced diameter segment 51 of earpiece 50. Earpiece 50 has a straight segment 51 of predetermined diameter. The diameter of segment 51 is slightly larger than the opening through the sidewalls of hinge 30 but is substantially the same as the inner diameter of hinge 30 so that the hinge 30 can clamp against the segment 51, but the hinge 30 will freely turn about the axis of segment 51.

Figure 4A:
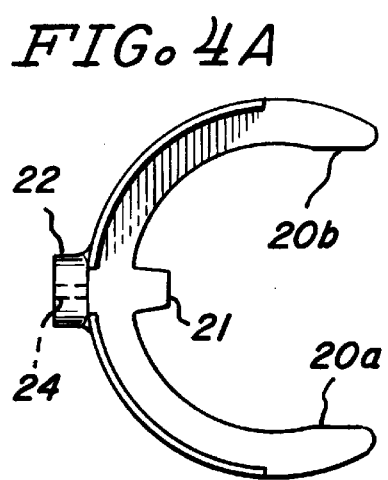
FIG. 4A shows an elevation view of the attachment adapter.
Figure 4B:
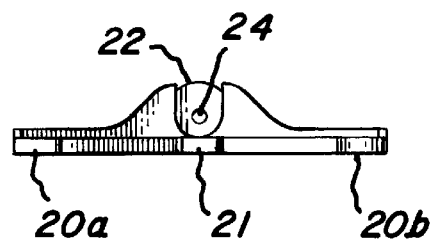
FIG. 4B shows an end view of the adapter.
Figure 4C:
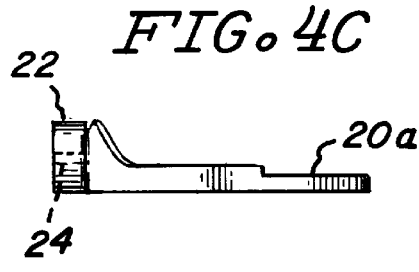
FIG. 4C shows a side view of the adapter.

FIG. 4A shows a top view of adapter 20; the projecting key 21 is positioned intermediate the C-shaped arms 20a and 20b. A stub section 22 extends outwardly from adapter 20 proximately in alignment with key 21. A hole 24 is drilled through stub section 22 and is sized to accept the screw 31 described above. FIG. 4B shows an end view of the adapter 20 taken along the line 4B—4B shown in FIG. 4A; this view illustrates the general shape of stub section 22 and the flat construction of arms 20a and 20b. FIG. 4C shows a view taken along the line 4C—4C of FIG. 4B.

Figure 5:
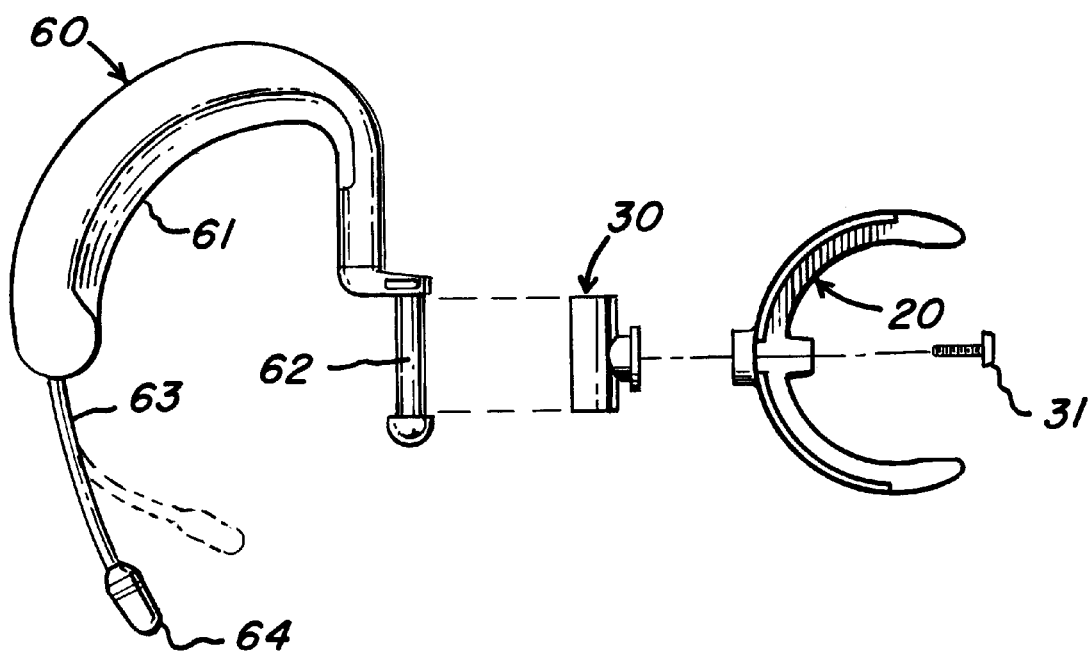
FIG. 5 shows an exploded view of the adapter with a further embodiment of an earpiece holder.

FIG. 5 shows a further embodiment of an earpiece which is adapted for connection to hinge 30 and an adapter 20 and to a microphone and earphone combination of the type described herein. The adapter 20 is connected to a hinge piece 30 as described earlier herein. Hinge 30 fits over a shank 62 which is formed on earpiece 60 and is rotatable about the axis of shank 62. Earpiece 60 has a curved portion 61 which is styled to comfortably fit over and behind the user's ear. A lower bendable extension 63 is attached to the bottom of curved portion 61. Extension 63 is bendable into a curved form, one example of which is shown in dotted outline in FIG. 5, and the extension will hold its shape after bending. Therefore, extension 63 may be bent to conform about the user's ear and to hold its position against the ear to support a connected microphone and earphone attachment. The bottom end 64 of extension 63 is shaped to comfortably engage against the user's head, preferably beneath the ear lobe.

In operation, the user first determines which type of earphone/microphone connection the user desires; next the user attaches the adapter 20 to the selected connector device by attaching the screw 31 either to the end of a resilient headset band or by attaching the adapter 20 to a hinge 30 with the screw 31. The hinge 30 may be joined to the narrowed segment 51 of the earpiece 50 to form a part of the earpiece connector. Finally, the adapter is engaged into the circumferential slot in the earphone housing 15 and the key 21 is inserted into the keyway slot 23. This completes the operational setup for either of the telephone earpiece devices.

The invention may be embodied in other specific forms without departing from the spirit or essential attributes thereof. It is, therefore, desired that the present embodiments be considered in all respects as illustrative and not restrictive, reference being made to the appended claims rather than to the detailed description to indicate the scope of the invention.

What is claimed is:

1. A microphone and earphone headset assembly adapted for self-support on a user's head comprising:
   a) a circular earphone housing having an outer circular edge and a partial circumferential groove in said outer edge, said groove having a depth of predetermined dimension and a deeper keyway slot in said groove;
   b) a microphone boom having a microphone connected at a distal end, said boom being pivotally connected to said earphone housing at a near end;
   c) an earpiece adapter, comprising a C-shaped portion sized for snugly fitting into said circumferential groove, said adapter having a projecting key portion on said C-portion, sized for fitting into said keyway slot in said circumferential groove;
   d) a support means for grasping against at least a portion of a user's head; and
   e) means for attaching said C-shaped portion to said support means, whereby said earphone is supported proximate the user's ear and said microphone is supported proximate the user's mouth.

2. The apparatus of claim 1, wherein said earpiece adapter further comprises a projecting key portion extending inwardly between the respective legs of said C-shaped portion.

3. The apparatus of claim 2, wherein said earpiece adapter further comprises an outwardly projecting cylindrical section having a hole therethrough.

4. The apparatus of claim 3, wherein said cylindrical section and said key portion are in proximate alignment with one another.

5. The apparatus of claim 1, wherein said support means comprises a resilient head band having a support pad on one end and a threaded hole on the other end; and said earpiece adapter further comprises an outwardly projecting stub section having a hole therethrough; and further comprising a screw insertable through said stub section hole and attachable to said threaded hole on the other end of said resilient head band.

6. The apparatus of claim 5, wherein said stub section and said key portion are aligned, one with the other.

7. The apparatus of claim 1, wherein said support means further comprises a closed loop structure sized for fitting over and behind a user's ear, and having a straight segment of predetermined diameter; and further comprising a hinge rotatably connected about said straight segment, said hinge having a threaded hole; and a screw connecting said earpiece adapter to said hinge through said threaded hole.

8. The apparatus of claim 7, wherein said earpiece adapter further comprises a projecting cylindrical section having a hole therethrough, and said screw connects to said hinge through said hole.

9. The apparatus of claim 8, wherein said cylindrical section and said key portion are in proximate alignment with one another.

10. The apparatus of claim 1, wherein said support means further comprises a curved member sized for fitting over and behind a user's ear, said curved member having a lower projecting bendable portion and a straight segment of predetermined diameter; and further comprising a hinge rotatably connected about said straight segment, said hinge having a threaded hole; and a screw connecting said earpiece adapter to said hinge through said threaded hole.

11. The apparatus of claim 10, wherein said lower projecting bendable portion further comprises a material which is deformable into any of a plurality of curved shapes, and which retains its shape after being deformed.

12. An earphone housing and removable earpiece adapter for said housing comprising:
   a) said housing having a circular shape with an outer peripheral groove extending more than half way about the circumference, said groove having a key slot therein of predetermined size;
   b) said earpiece adapter comprising a C-shaped member sized for snugly fitting into said peripheral groove, and said C-shaped member further comprising a projecting key portion sized for engaging into said key slot; and
   c) means for connecting said earpiece adapter to an earpiece for supporting said housing on a user's head.

13. An earpiece and earpiece adapter for connecting to an earphone housing and microphone boom comprising:
   a) said earpiece having an upper curved portion shaped for fitting behind a user's ear and having a lower projecting portion deformable into multiple curvilinear shapes and having a straight segment of predetermined diameter;
   b) said earpiece adapter comprising a hinge rotatably fitted over said straight segment and having a threaded hole therein; and further comprising a C-shaped clamp sized for clamping against said earphone housing, and a hole therethrough alignable with said hinge threaded hole; and
   c) a screw sized for fitting through said hole in said C-shaped clamp and for threading into said threaded hole.

* * * * *